G. BOYCE.
Paper-Box Machine.
No. 225,915. Patented Mar. 30, 1880.
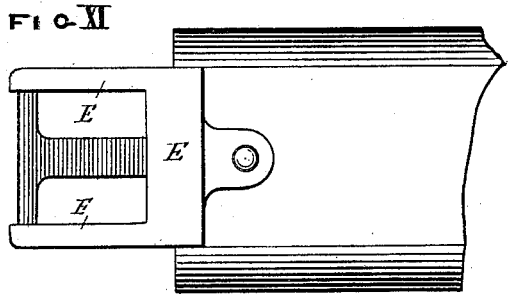
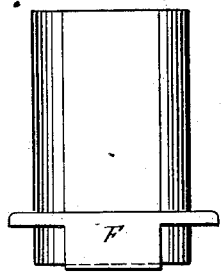
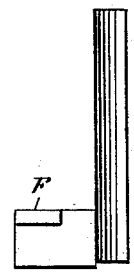
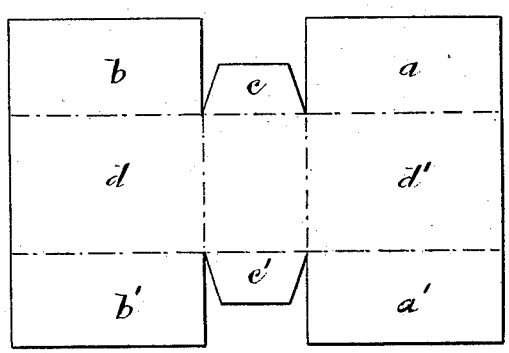
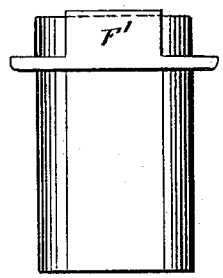
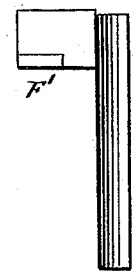
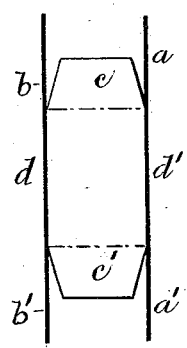
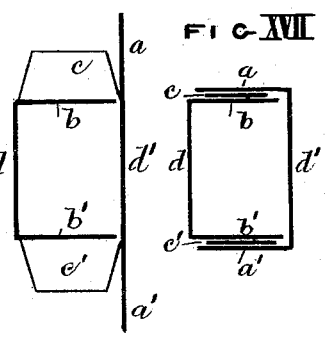
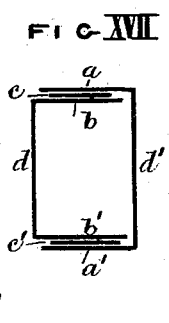
Witnesses,
Richard Skerrett
Henry Skerrett
Inventor
George Boyce

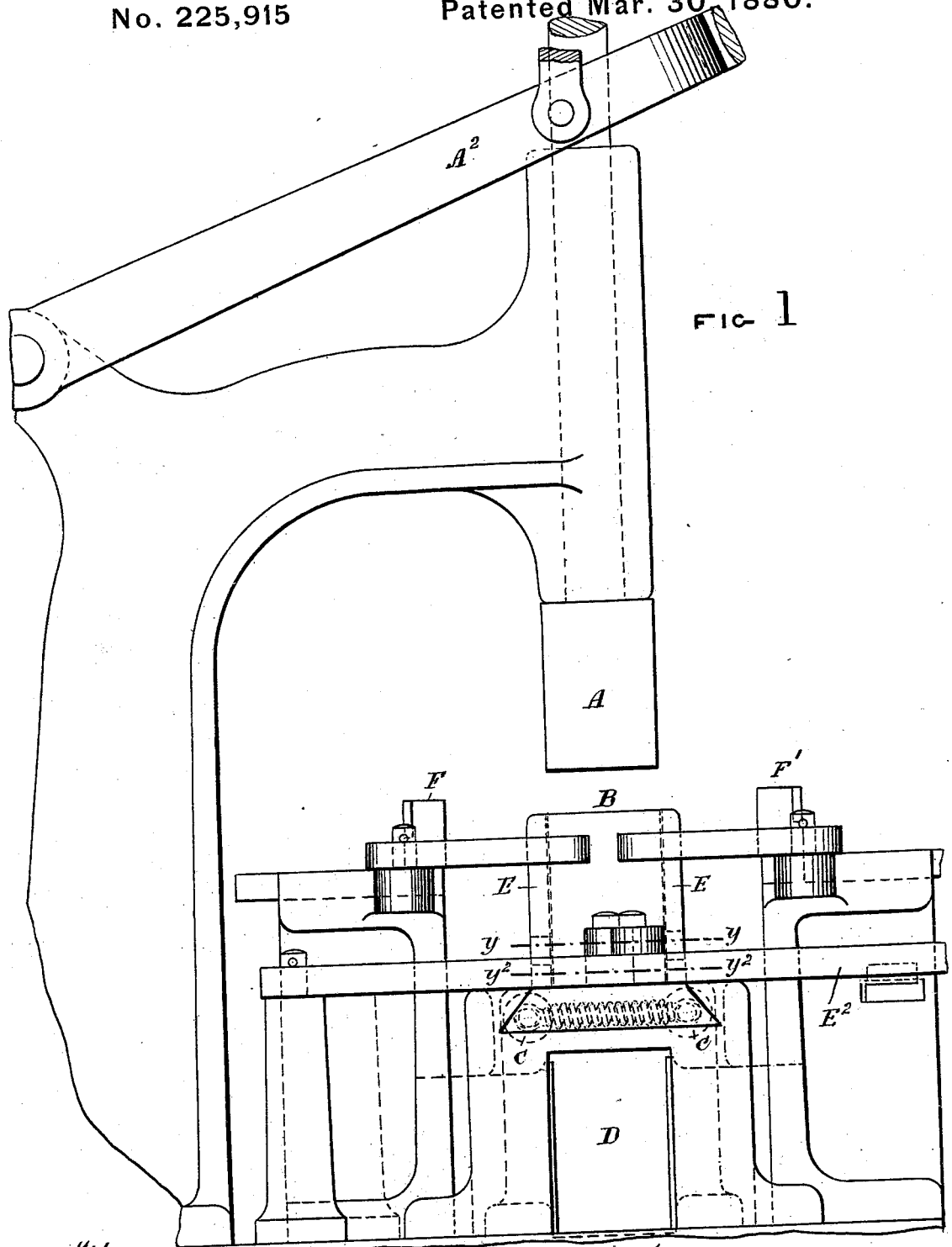

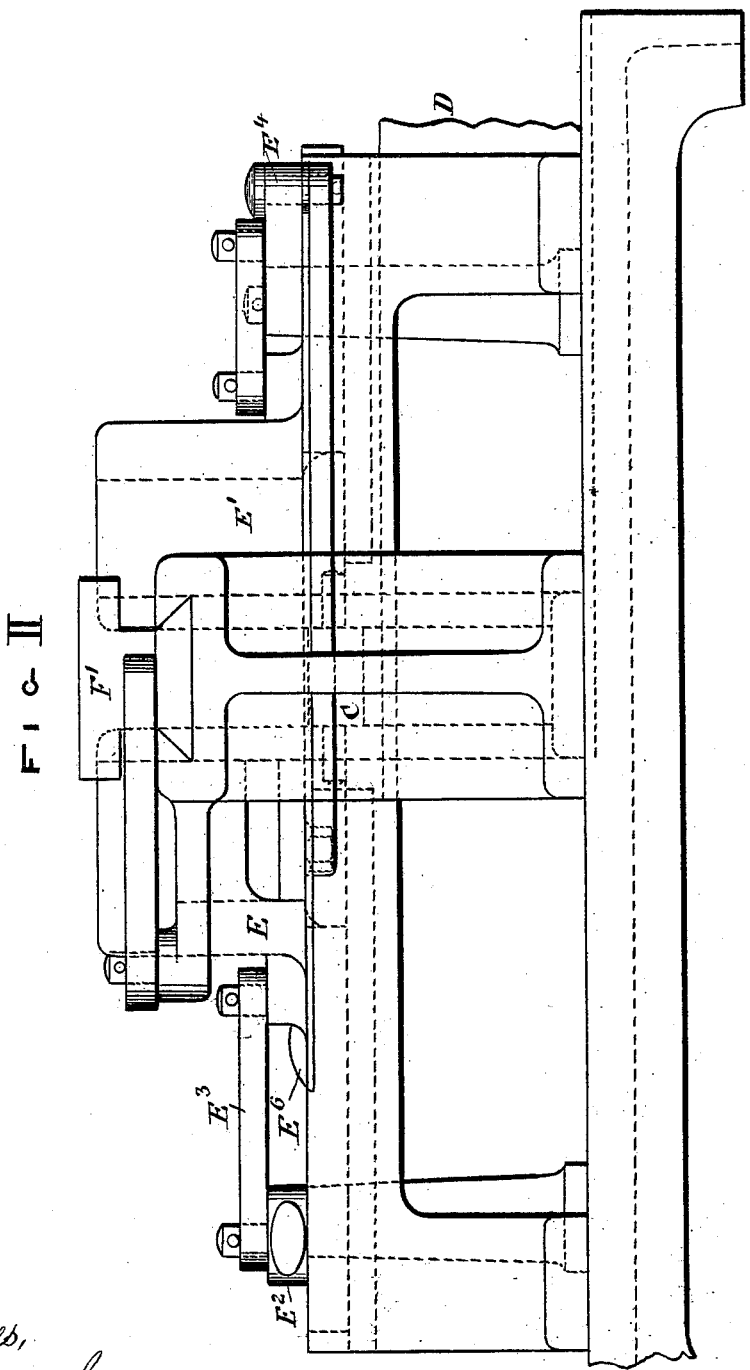

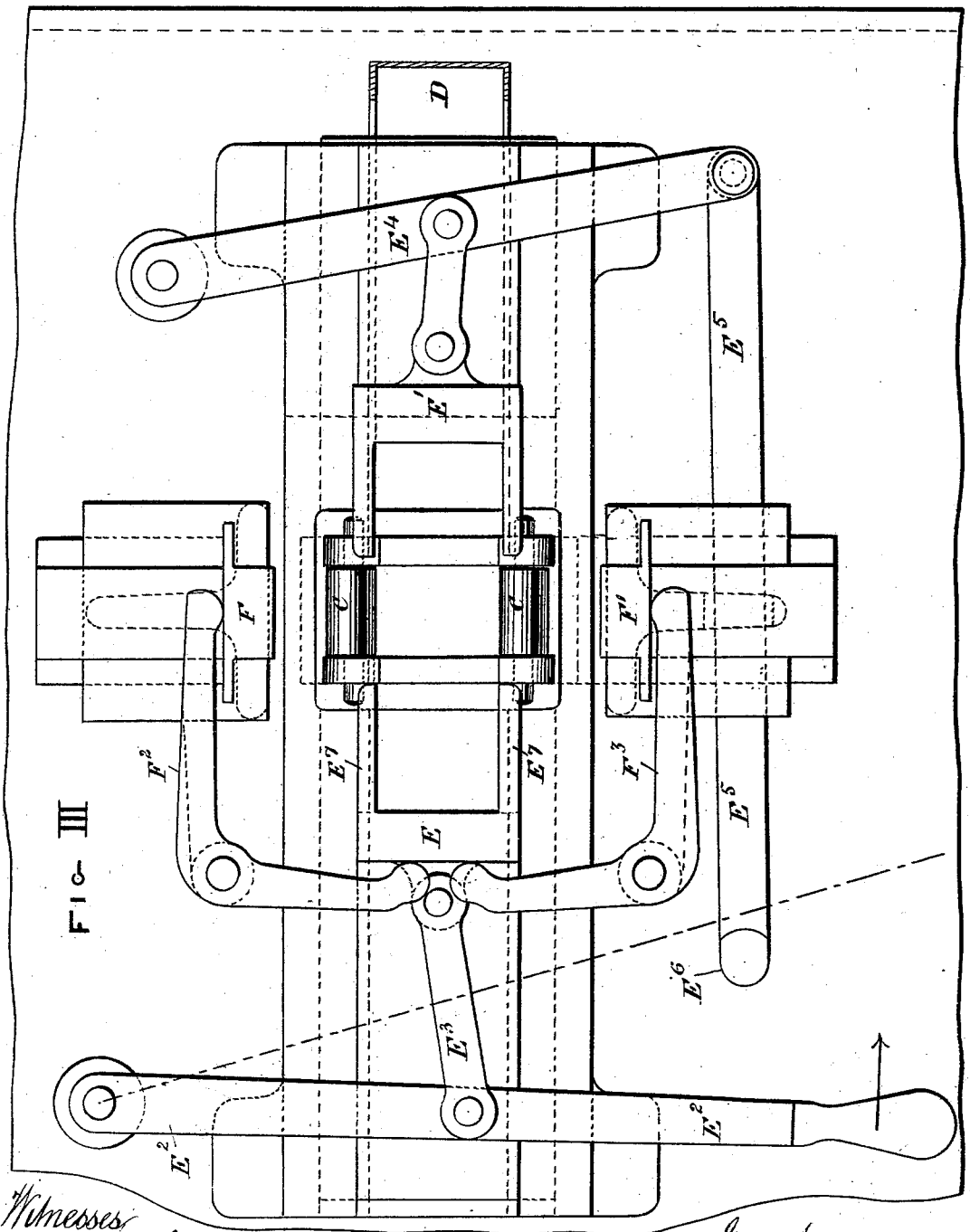

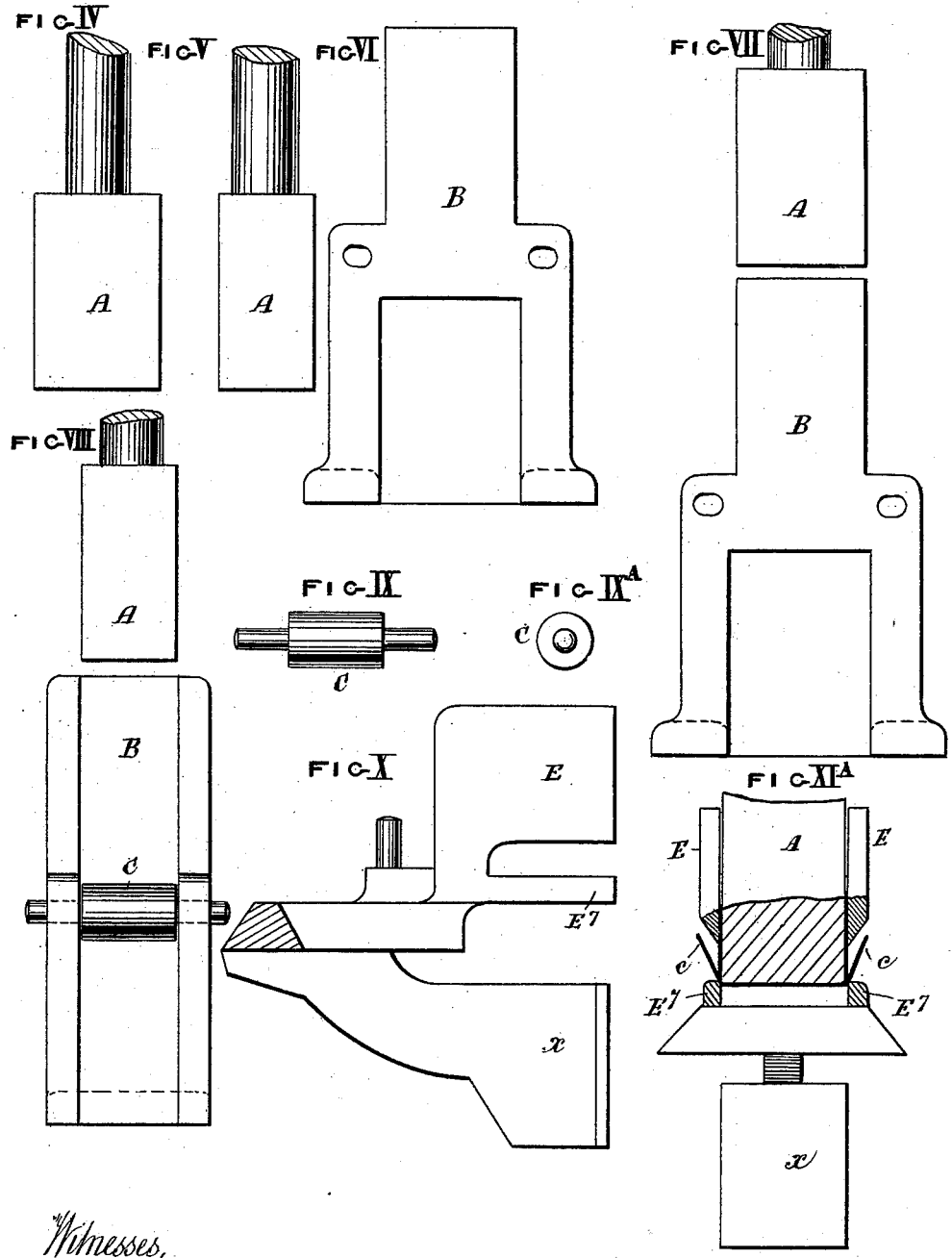
G. BOYCE.
Paper-Box Machine.
No. 225,915. Patented Mar. 30, 1880.

UNITED STATES PATENT OFFICE.

GEORGE BOYCE, OF KING'S NORTON, ENGLAND.

PAPER-BOX MACHINE.

SPECIFICATION forming part of Letters Patent No. 225,915, dated March 30, 1880.

Application filed November 29, 1879. Patented in England, May 14, 1879.

*To all whom it may concern:*

Be it known that I, GEORGE BOYCE, of King's Norton, in the county of Worcester, England, manager of works, have invented new and useful Improvements in Machinery for the Manufacture of Paper, Card-Board, and Mill-Board Boxes, which improvements are fully set forth in the following specification, reference being had to the accompanying drawings.

My invention consists of the improvements hereinafter described in the said machinery, whereby properly-shaped blanks, glued or pasted on certain parts, are rapidly folded and formed into boxes open at one end, or provided at the open end with a closing-flap.

Two of the said boxes with flaps of slightly different sizes may be made to slide one within the other to form a convenient case or holder for storing or making up small articles for sale.

I construct a machine according to my invention in the following manner: A die-block or plunger on which the box is to be formed has a vertical rising-and-falling motion given to it. In its descent the said die-block or plunger enters a lower die consisting of a rectangular tube from which two opposite sides have been cut away for a certain distance. Sliding horizontally, and situated opposite to each other, are two closers or folders, the sides of either of which close, when pressed home, the open sides of the lower die, thereby temporarily converting it into a complete tubular die. The paper or card-board blanks from which boxes are to be made have such a shape that the two flaps or wings on opposite sides, when folded upon one another and glued together, form the sides of the box. Two other wings or flaps extending from the bottom of the box are also folded and glued to the sides.

The minor parts of the machine I will describe in conjunction with the making of a box.

The blank, having the required flaps properly glued, is placed upon the top of the lower die, with the glued side upward, both closers or folders being in their retired or withdrawn positions. Spring levers or placers on each side of the lower die serve to determine the exact position of the blank upon the lower die.

The die-block or plunger now descends upon the blank, the "placers" at the same time retiring. Two of the sides of the box are thus folded upon the die-block or plunger by the sides of the tubular lower die. The front closer now advances horizontally and closes the two unglued flaps of the blank on the other sides of the die-block or plunger. The block or plunger descends a short distance, thereby folding or turning upward the flaps at the bottom of the box by means of arms carried by the front closer. The back closer now advances simultaneously with the retiring of the front closer, and thereby effects the folding of the glued side flaps upon the previously-folded unglued side flaps and glued bottom flaps.

The box thus completed is carried down upon the die-block or plunger through the bed of the machine, and during its descent the folded and glued ends are pressed upon by spring-rollers, by which the glued parts are pressed tightly together and consolidated.

The box is delivered on the under side of the bed of the machine, and when it is of large size or of strong material may be received in a delivery-chute. By an attachment to the front closer the last-formed box is pushed into the chute. This chute may be made to contain twenty or other number of the boxes, so that each box remains in the chute while, say, nineteen other boxes are formed, and the first-formed box is only pushed out of the delivery-chute on the introduction of the twentieth-formed box. During the traveling of the boxes in the chute their glued sides are in contact with the sides of the chute, and they are thereby retained in their places. Ordinarily, however, the glued parts are sufficiently consolidated by the passage of the box through the pressing-rollers of the machine, and the delivery-chute described is unnecessary.

I will now proceed to describe with reference to the accompanying drawings the construction of my machine.

Figure I represents a front elevation of the complete machine. Fig. II represents a side elevation of the same, and Fig. III represents a plan of the same.

For the sake of clearness the coiled springs by which the return motions of several moving parts are effected are not represented in the machine in Figs. I, II, and III.

Fig. IV represents a front elevation of the die-block or plunger detached, and Fig. V represents a side elevation of the same. Fig. VI represents in back elevation, Fig. VII in front elevation, and Fig. VIII in side elevation, the tubular die detached. Fig. IX represents in front elevation, and Fig. IX$^A$ in side elevation, one of the consolidating-rollers of the machine detached. Fig. X represents a side elevation; Fig. XI, a plan; and Fig. XI$^A$, an end view, partially cut away, and showing the plunger and blank in position. Fig. XII represents in plan, and Fig. XIII in elevation, the guides of the machine detached. Fig. XIV represents one of the blanks ready for the machine. Fig. XV represents the blank after the first operation—namely, the descent of the die-block or plunger A, by which the parts $d$ $d'$ of the blank are brought vertical and parallel to each other. Fig. XVI represents the blank after the second operation—namely, the advance of the front closer or folder, E, by which the parts $b$ $b'$ of the blank are folded in the manner represented. Fig. XVII represents the blank after the third operation—namely, after the advance of the back closer or folder, E', and the folding of the parts $a$ $a'$ of the blank, and also the small flaps $c$ $c'$.

The same letters of reference indicate the same parts in the several figures of the drawings.

A is the die-block or plunger. E is the front closer or folder, and E' is the back closer or folder. B is the tubular die-block, and F F' are the guides.

The several parts of the machine are actuated as follows: The die-block or plunger A is worked by the lever A$^2$. The closers E E' are worked by the lever E$^2$. This lever is connected to the front closer, E, by the link E$^3$, and operates upon the back closer, E', in the following manner: The said back closer, E', is connected by a link to the lever E$^4$, to which the sliding rod E$^5$ is jointed. The free end of the said rod E$^5$ has an incline, E$^6$, and the said rod E$^5$ is slightly elastic. As the lever E$^2$ is moved in the direction of the arrow, Fig. III, into the position indicated by dotted lines, it urges forward the front closer, E, the said lever E$^2$ passing up and depressing the incline E$^6$ on the end of the sliding rod E$^5$, and engaging behind the shoulder of the said incline, so that when the lever E$^2$ is moved in a direction contrary to that indicated by the arrow, Fig. III, it not only produces the return motion of the front closer, E, but also produces the advance motion of the back closer, E'. After the lever E$^2$ has performed its return motion and produced the advance motion of the back closer, E', the incline E$^6$ is depressed by the finger of the workman when it is disengaged from the lever E$^2$, and is restored to the position represented in Fig. III by a coiled spring connected with the closer-lever E$^4$.

The guides F F', by which the blank is adjusted to its exact position when it is first introduced into the machine, are operated by the cranked levers F$^2$ F$^3$. These levers F$^2$ F$^3$ bear, respectively, by one of their ends, against the guides F F', and by their other ends against the front of the closer E, as best seen in Fig. III.

The guides F F' have a limited motion, which is effected by moving the lever E$^2$ in a direction contrary to the arrow, Fig. III, thereby causing the front of the closer E to act on the levers F$^2$ F$^3$ and press the guides F F' toward each other and adjust the blank in the machine. The return motion of the guides F F' is effected by springs.

The action of the machine is as follows: A blank, Fig. XIV, is placed upon the top of the tubular lower die, B, the flaps $a$ $a'$ $c$ $c'$ having been glued. The lever E$^2$ is drawn back a short distance, so as to make the guides F F' close upon and adjust the position of the blank. The die-block or plunger A is now depressed by means of the lever A$^2$, so as to carry down the blank until its lower end reaches the level $y$, Fig. I, between the sides of the tubular die B, and fold the blank in the manner represented in Fig. XV. The said lever E$^2$ is now moved in the direction of the arrow, Fig. III, by which motion the front closer, E, is made to advance and fold the parts $b$ $b'$ of the blank in the manner represented in Fig. XVI, the said lever E$^2$ at the same time engaging with the incline E$^6$ in the manner already explained. The lever A$^2$ being still further depressed, the die-block is carried down to the level $y^2$, Fig. I, and the glued small flaps $c$ $c'$ are thereby raised into a vertical position by the arms E$^7$ E$^7$ of the front closer, E. (See Fig. XI$^A$.) The glued small flaps $c$ $c'$ are thus folded upon the already-folded flaps $b$ $b'$. The lever E$^2$ is next made to perform its back stroke. The back closer, E', is thereby made to advance and to close the glued flaps $a$ $a'$ upon the folded flaps $b$ $b'$ and $c$ $c'$, Fig. XVII, and the box is completed. The block or plunger A is next further depressed, and the box formed is carried down to the chute D, the folded and glued parts being pressed upon by the consolidating-rollers C C and the glued parts compressed between the said rollers and the die-block or plunger A. On the ascent of the block or plunger A the box formed is left in the chute D, and is forced forward along the said chute by the piece $x$ on the under side of the front closer, E, out of the way of the box next formed.

Where paste is employed in place of glue a chute of a length sufficient to hold about twenty boxes is employed, the figure of the folded parts of the boxes being preserved by the sides of the chute; and by the time the first-formed box is ejected from the mouth of the chute the pasted parts are sufficiently secured together.

When glue is employed the chute may be dispensed with, and the box, as it is carried down by the plunger or die-block, falls into a receptacle underneath the machine.

The machine I have described and represented is worked by hand; but the several motions described as being effected by the hand of the workman or attendant may be effected automatically and the machine driven by steam or other power. The additions or modifications required for this purpose are such as are well known to machinists, and I therefore do not think it necessary to describe the same.

Having now described the nature of my invention and the manner in which the same is to be performed, I wish it to be understood that I claim as my invention of improvements in machinery for the manufacture of paper, card-board, and mill-board boxes—

1. In a paper-box machine, the combination, with the die-block or plunger, of the placers or guides located on opposite sides of the path of said plunger, and mechanism, substantially as described, for moving said placers or guides simultaneously toward or away from each other, as set forth.

2. In combination with the die-block or plunger of a paper-box machine, the lower tubular die, consisting of a rectangular tube from which the two opposite sides have been partially cut away, substantially as described.

3. The combination of the plunger, tubular die, front and back closers or folders, and operating mechanism, substantially as described.

4. The combination of the plunger, placers or guides for adjusting the position of the blank, the tubular lower die, front or back closers or folders, and operating mechanism, substantially as described.

GEORGE BOYCE. [L. S.]

Witnesses:
RICHARD SKERRETT,
HENRY SKERRETT,
*Both of No. 37 Temple Street, Birmingham.*